March 24, 1925.  1,531,205
T. J. McSWEENEY, SR
AUTOMATIC QUICK SERVICE ATTACHMENT FOR AIR BRAKES
Filed May 11, 1923
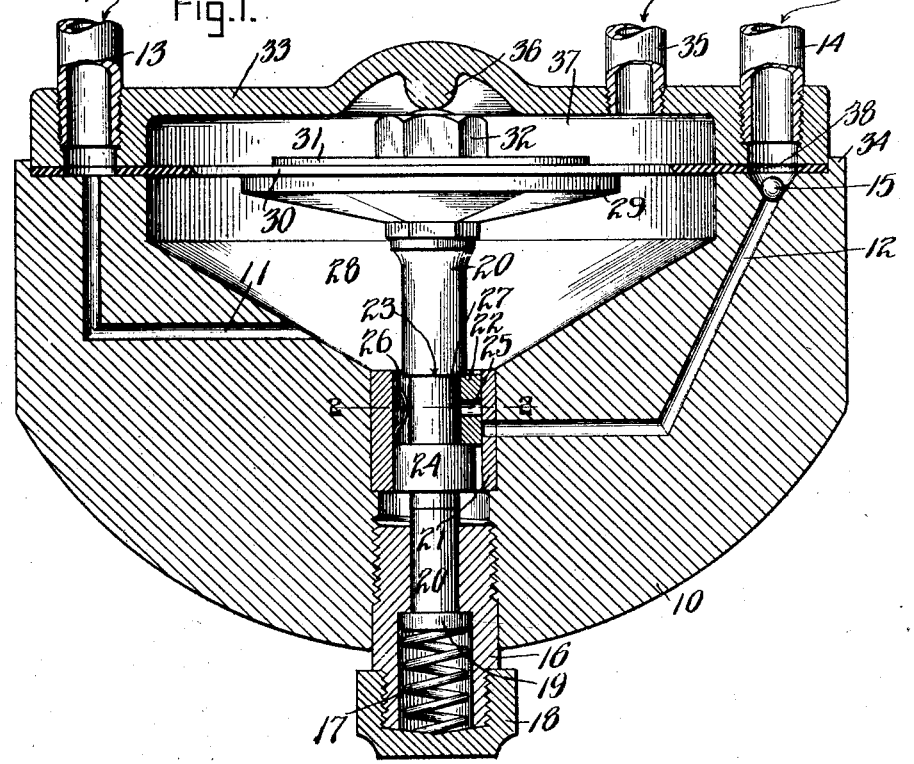
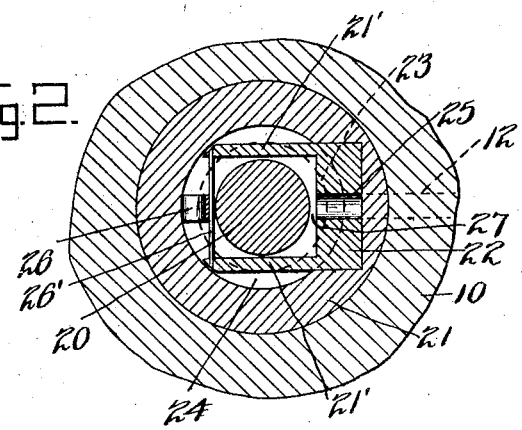
Inventor
Thomas J. M<sup>c</sup>Sweeney Sr.
By
Attorney Patented Mar. 24, 1925.

1,531,205

UNITED STATES PATENT OFFICE.

THOMAS J. McSWEENEY, SR., OF CHARLESTOWN, MARYLAND.

AUTOMATIC QUICK-SERVICE ATTACHMENT FOR AIR BRAKES.

Application filed May 11, 1923. Serial No. 638,350.

*To all whom it may concern:*

Be it known that I, THOMAS J. MCSWEENEY, Sr., a citizen of the United States, residing at Charlestown, in the county of Cecil and State of Maryland, have invented certain new and useful Improvements in Automatic Quick-Service Attachments for Air Brakes, of which the following is a specification.

My said invention relates to an automatic quick service attachment for air-brakes and it is an object of the invention to provide pneumatic means for creating uniform brake application throughout the entire train. It is known that in mechanically controlled pneumatic brake systems as at present employed there is a lag in the application of brakes from car to car so that on a train of twelve cars the brake application on the last car may take place as much as four seconds later than on the first car. This causes nonuniform braking action and undesirable strains on the couplers and other parts.

Another object of the invention is to provide an automatic quick service attachment the uniform action of which will not be impaired by ring leakage or friction in the air operating mechanism.

A further object of the invention is to provide a simple and inexpensive device which can be attached to brake systems at present in use without scraping such devices or parts thereof and which can be easily and cheaply installed.

Still another object of the invention is to provide means which will insure that the minimum reduction of train pipe pressure that can be made by the engineer will cause uniform application of all the brakes.

Referring to the accompanying drawings which are made a part hereof and on which similar reference characters indicate similar parts, Figure 1 is a vertical section of my device, and Figure 2, a horizontal section on line 2—2 of Figure 1.

In the drawings reference character 10 indicates the body of the attachment which may be of any desirable form, the form shown in the drawings being that at present preferred by me. This body has a pair of air passages 11 and 12 extending from a central vertical opening to the upper surfaces of the body. At its upper end the passage 11 communicates with the train air-brake pipe by way of air pipe 13 while the passage 12 at its upper end communicates with a pipe 14 leading to the brake cylinder. A check valve 15, here shown as consisting of a ball, is provided in the upper enlarged part of the passage 12.

At the lower end the central opening in the body is closed by a hollow bolt 16 having a central passage enlarged at its lower end to provide a space for a spring 17 confined at its lower end by a nut 18 and bearing at its upper end against the head 19 of a plunger 20 passing through the reduced upper part of the opening in the bolt. A bushing 21 is located in the opening and has a passage registering with the passage 12. A valve 22 is held between a pair of shoulders 23 and 24 on the plunger 20', the valve face bearing against the bushing 21 and a port in said valve at 25 is adapted to register with the passage 12. At the opposite side of the plunger a spring 26 is provided to rest with its ends against the inside wall of the bushing 21 and this spring bears against a pin 26' held in openings in the wings 21' of the slide valve. The spring serves to hold the valve 22 in place against its seat on the inner wall of the bushing.

A space 27 at the rear of the valve 22 communicates with the chamber 28 to provide a passage for air from the chamber to the passage 12. At its upper end the plunger 20' carries a head 29. A diaphragm 30 is held between said head and a washer 31 fixed in place on the plunger by a nut 32. At its periphery the diaphragm is held fast between the body 10 and a cap 33 in which the pipes 13 and 14 are fixed. The body 10 has an upstanding flange 34 inside which the cap 33 fits. The cap has an opening in which is mounted a pipe 35 leading, according to the nature of the air-brake system, to the auxiliary reservoir of a triple valve or to the pressure chamber in a passage controlled valve or to the service reservoir or auxiliary reservoir in a universal control valve. A boss at 36 which may be rigid or yielding provides an abutment against which the plunger 20' strikes to act as a stop, for example to take the strain off the diaphragm when charging brakes. The spring 17 acts to hold the diaphragm substantially in normal position and serves also to stabilize the action of the device to guard against movement of ports due to slight fluctuations in brake pipe pressure.

In the use of my device when the engineer opens the automatic brake valve on the engine and releases pressure from the brake pipe the pressure reduction will travel along the brake pipe until it reaches the first train unit equipped with braking means when the pressure in the chamber 28 will be reduced as compared with the pressure in the chamber 37 above the diaphragm, thus overcoming the tension of spring 17. Thereupon the diaphragm will move downward and open the passage from the chamber 28 through ports and passages 27, 25 and 12 to the brake cylinder whereupon pressure from the train air-brake pipe will escape into the brake cylinder or atmosphere as desired. In the latter case the check valve will not be required. The amount of pressure so escaping is negligible so far as the actual amount of air going to the brake cylinder is concerned and it might well escape into the atmosphere except that by passing into the brake cylinder it is utilized and the accumulation of dirt is avoided by omitting the passage to atmosphere. The action of the air in the brake cylinder assists in the movement of the brake cylinder piston. The effect of such escape of pressure on the uniform application of brakes throughout the train, however, is of great importance since this action is cumulative throughout the entire length of the train, or otherwise expressed, as the reduction reaches each train unit an additional increment of reduction is added, the action being exactly the converse of what would take place if brakes were applied by increasing pressure in the train pipe and if then at each train unit an additional increment of pressure (or kick) were added to the pressure coming from the engine.

The pressure from the auxiliary reservoir will now flow to the brake cylinder in the usual manner until the pressure in the pipe 35 is so far reduced that the pressures on the opposite sides of the diaphragm 30 are equal within the differential produced by spring 17, when the plunger 20 will rise and cut off the passage from the train pipe to the brake cylinder. The object of the check valve 15 will now be apparent in that back pressure from the brake cylinder cannot reach the chamber 28 with consequent loss of pressure in the brake cylinder. It will also be evident that the passage from the train air-brake pipe to the brake cylinder will be open until the brakes are applied, i. e. the piston plunger 20 will be down until the pressure in chamber 37 is reduced below that in the chamber 28.

The wear of packing rings in automatic air brake devices ordinarily is calculated to give rise to trouble and to delay the action of the brakes for the reason that when the brake pipe pressure is reduced the packing ring leakage destroys the possibility of building a differential pressure on the opposite sides of pistons. With my device, on the contrary, wear of the packing rings will not destroy the uniform application of the brakes for the reason that the operation causes a drop in brake pipe pressure at a sufficient rate to cause the automatic valves to go into service position quickly, but not into emergency position.

The feature of using the service reservoir pressure, when attached to universal valves makes a positive brake application irrespective of friction on the equalizing slide valve or excessive ring leakage on the equalizing slide valve piston, due to the fact that the service reservoir volume is separated from the auxiliary reservoir volume when the universal valve is in release position. However, if desired we may attach this connection to the auxiliary reservoir.

It will be obvious to those skilled in the art that many changes may be made in my device without departing from the spirit of my invention and therefore I do not limit myself to what is shown in the drawings and described in the specification but only as indicated in the appended claims.

Having thus fully described my said invention, what I claim as new and desire to secure by Letters Patent, is:

1. In an air brake system, a train pipe, and means at each train unit for causing a further reduction of pressure in the train pipe when the pressure in said pipe is reduced for effecting service application of the brakes, substantially as set forth.

2. In an air brake system, a train pipe, and means at each train unit for causing cumulative reduction of pressure toward the rear end of the train when the pressure in said pipe is reduced for effecting brake application, substantially as set forth.

3. In an air brake system, a train pipe, and a connection at each train unit between the train pipe and the brake cylinder for causing cumulative reduction of pressure toward the rear end of the train when the pressure in said pipe is reduced for effecting service application of the brakes, substantially as set forth.

4. In an air brake system, a train pipe, and a connection at each train unit between the train pipe and the brake for causing cumulative reduction of pressure toward the rear end of the train when the pressure in said pipe is reduced for effecting service application of the brakes, substantially as set forth.

5. In an air brake system, a diaphragm, chambers separated thereby, a rod connected centrally to said diaphragm, means at one side of the diaphragm tending to distort said diaphragm, and a stop at the other side to limit such movement, substantially as set forth.

6. In an air-brake system, a diaphragm, chambers separated thereby, a rod connected centrally to said diaphragm, means tending to move said rod upward, means at the upper side of the diaphragm for limiting such movement, a passage leading from the lower chamber, a bushing surrounding the rod and having a port communicating with said passage, a valve slidable with the rod having a port communicating with said passage, and means on the opposite side of the rod from said valve for holding the valve to its seat on the inner wall of said bushing, substantially as set forth.

In witness whereof I have hereunto set my hand and seal at Washington, District of Columbia, this 11th day of May, A. D. nineteen hundred and twenty-three.

THOMAS J. McSWEENEY, Sr. [L. S.]

Witnesses:
    FRANK W. DAHN,
    A. J. WILLIAMS.